United States Patent
Diaz et al.

(10) Patent No.: US 12,346,120 B2
(45) Date of Patent: Jul. 1, 2025

(54) DETECTING EMPTY WORKSPACES FOR ROBOTIC MATERIAL HANDLING

(71) Applicant: Siemens Aktiengesellschaft, Munich (DE)

(72) Inventors: Ines Ugalde Diaz, Redwood City, CA (US); Eugen Solowjow, Berkeley, CA (US); Yash Shahapurkar, Berkeley, CA (US); Husnu Melih Erdogan, Berkeley, CA (US); Eduardo Moura Cirilo Rocha, Albany, CA (US)

(73) Assignee: Siemens Aktiengesellschaft, Munich (DE)

( * ) Notice: Subject to any disclaimer, the term of this patent is extended or adjusted under 35 U.S.C. 154(b) by 243 days.

(21) Appl. No.: 18/181,659

(22) Filed: Mar. 10, 2023

(65) Prior Publication Data

US 2023/0305574 A1    Sep. 28, 2023

(51) Int. Cl.
*G05D 1/00* (2024.01)
*B25J 5/00* (2006.01)
*B25J 9/16* (2006.01)

(52) U.S. Cl.
CPC ............ *G05D 1/0251* (2013.01); *B25J 5/007* (2013.01); *B25J 9/1697* (2013.01)

(58) Field of Classification Search
CPC ........ G05D 1/0251; B25J 5/007; B25J 9/1697
See application file for complete search history.

(56) References Cited

U.S. PATENT DOCUMENTS

| | | | |
|---|---|---|---|
| 2014/0052295 A1 | 2/2014 | Eakins et al. | |
| 2014/0132724 A1* | 5/2014 | Choi | G02B 30/52 359/290 |
| 2016/0171336 A1* | 6/2016 | Schwartz | G06F 18/23 382/173 |
| 2020/0061811 A1* | 2/2020 | Iqbal | G06N 3/08 |
| 2020/0316782 A1* | 10/2020 | Chavez | G06T 7/12 |
| 2020/0361083 A1 | 11/2020 | Mousavian et al. | |
| 2022/0032467 A1* | 2/2022 | Odhner | G05B 19/4155 |
| 2022/0297958 A1* | 9/2022 | Moreno | B25J 9/1689 |

* cited by examiner

*Primary Examiner* — Khoi H Tran
*Assistant Examiner* — Nhi Q Bui

(57) ABSTRACT

It is recognized herein that robots or autonomous systems can lose time when computing grasp scores for empty bins. Further, when grasps are attempted on empty bins, for instance due to the related grasp score computations, the robot can lose additional time through being used unnecessarily to attempt the grasp. Such usage can wear on the robot, or damage the robot, in some cases. An autonomous system can classify or determine whether a bin contains an object or is empty, for example, such that a grasp computation is not performed when the bin is empty. In some examples, a system classifies a given bin at runtime before each grasp computation is performed. Thus, systems described herein can avoid performing unnecessary grasp computations, thereby conserving processing time and overheard, among addressing other technical problems.

7 Claims, 3 Drawing Sheets

DETECTING EMPTY WORKSPACES FOR ROBOTIC MATERIAL HANDLING

BACKGROUND

Autonomous operations, such as robotic grasping and manipulation, in unknown or dynamic environments present various technical challenges. Autonomous operations in dynamic environments may be applied to mass customization (e.g., high-mix, low-volume manufacturing), on-demand flexible manufacturing processes in smart factories, warehouse automation in smart stores, automated deliveries from distribution centers in smart logistics, and the like. In order to perform autonomous operations, such as grasping and manipulation, in some cases, robots may learn skills using machine learning, in particular deep neural networks or reinforcement learning.

In particular, for example, robots might interact with different objects under different situations. Some of the objects might be unknown to a given robot. Bin picking is an example operation that robots can perform using AI. Bin picking refers to a robot grasping objects that can define random or arbitrary poses, from a container or bin. The robot can move or transport the objects, and place them at a different location for packaging or further processing. It is recognized herein, however, that current approaches to robotic picking lack efficiency and capabilities. In particular, current approaches often do not properly or efficiently identify objects within certain workspaces of a given robot, due to various technical challenges in doing so.

BRIEF SUMMARY

Embodiments of the invention address and overcome one or more of the described-herein shortcomings or technical problems by providing methods, systems, and apparatuses for determining, during runtime of a robot, whether a bin or container is empty or contains an object for grasping by the robot, before performing any grasp computations related to the bin.

In an example aspect, an autonomous system includes a robot configured to operate in an active industrial runtime so as to define a runtime. The robot includes an end effector configured to grasp a plurality of objects within a workspace. The autonomous system can include a depth camera configured to capture a depth image of the workspace. The autonomous system further includes a processor and a memory storing instructions that, when executed by the processor, cause the autonomous system to perform various operations. In particular, the system can detect a bin within the workspace. The bin can define any container or tray that is capable of containing one or more of the plurality of objects. Based on the depth image and without performing a grasp computation, in various examples, the system can determine whether the bin is empty or contains at least one object.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

As an initial matter, robotic bin picking generally consists of a robot equipped with sensors or cameras, such that the robot can grasp (pick) objects in random poses from a container (bin) using a robotic end effector. In various examples described herein, objects can be known or known to the robot, and objects can be of the same type or mixed. In some cases, the robot performs a bin picking algorithm before each pick, so as to calculate and determine which grasp the robot executes next. In particular, for example, a given robotic system can use a deep neural network to compute grasp points. It is recognized herein, however, that a technical problem involved in robotic grasping is assessing or determining whether a given workspace of the robot is empty or contains an object. In an example embodiment, if the workspace is empty, no grasp computation is triggered. Alternatively, continuing with the example, if the workspace, in particular a bin within the workspace, contains an object, grasp computation is triggered. It is recognized herein that current grasp neural networks often compute and return a grasp computation regardless of whether the bin is empty or not. In such a system, when a given workspace is empty, a quality score associated with the returned grasp can be low. It is further recognized herein, however, that computing grasp scores for empty workspaces can be unreliable. For example, a given system might not be able to rely on its grasp neural network to correctly assess whether a given bin is filled or empty. In particular, the error rate of neural networks can be too high for the task of identifying empty workspaces, such that a given system may generate false positives. For example, the system may generate a grasp computation score (grasp score) associated with an empty bin that indicates that an object is within the empty bin.

Additionally, it is further recognized herein that robots or autonomous systems can lose time computing grasp scores for empty bins. Further still, when grasps are attempted on empty bins, for instance due to the related grasp score computations, the robot can lose additional time through being used unnecessarily to attempt the grasp. Such usage can wear on the robot, or damage the robot, in some cases.

Embodiments described herein can classify or determine whether a bin contains an object or is empty, for example, such that a grasp computation is not performed when the bin is empty. In some examples, a system classifies a given bin at runtime before each grasp computation is performed. Thus, systems described herein can avoid performing unnecessary grasp computations, thereby conserving processing time and overheard. Additionally, systems described herein can avoid attempting grasps on empty bins based on ambiguous or incorrect grasp computations, thereby conserving operational time and preserving the robot and related components.

Figure 1:
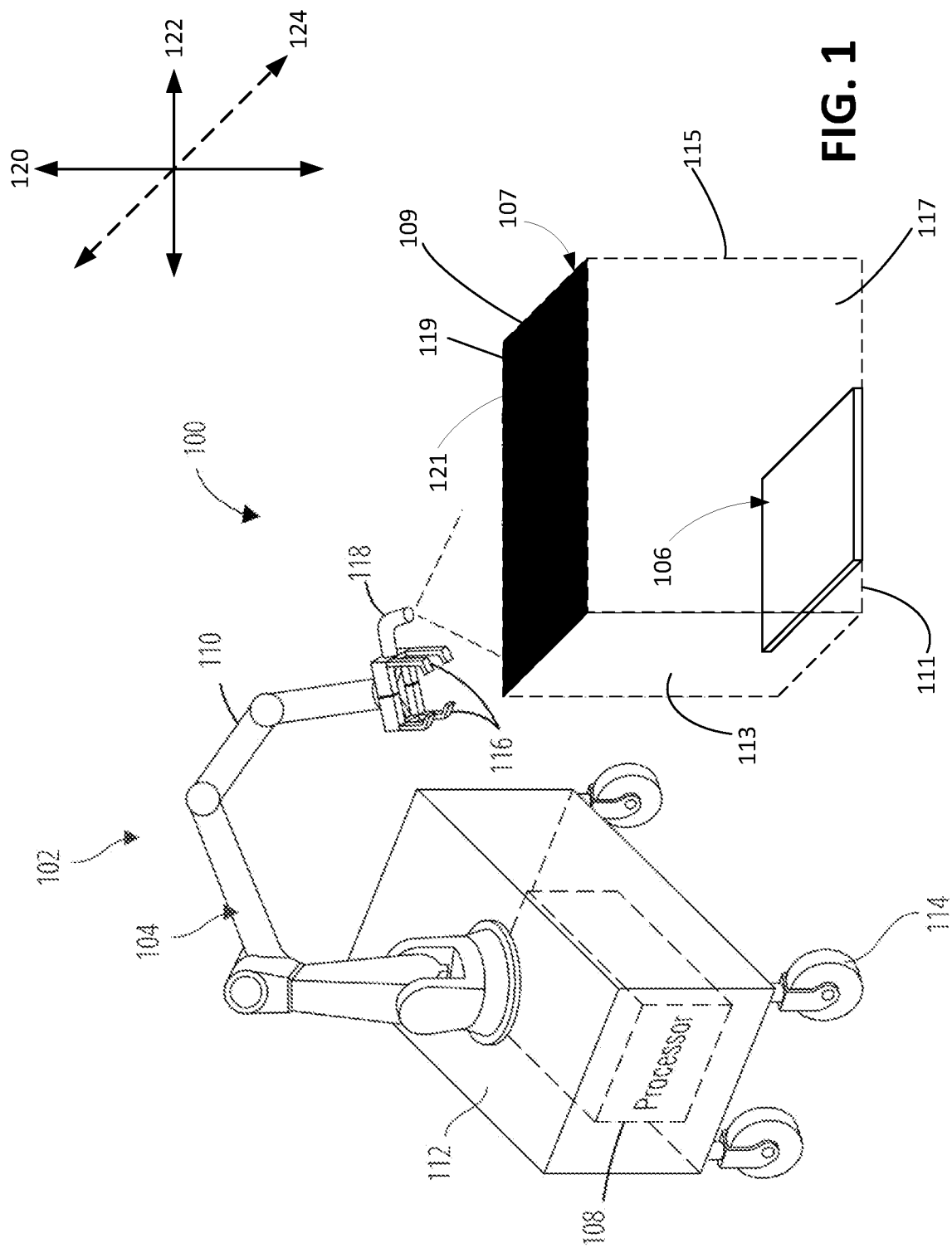
FIG. 1 shows an example autonomous system in an example physical environment that includes a bin capable of containing various objects, in accordance with an example embodiment.

Referring now to FIG. 1, an example industrial or physical environment or workspace 100 is shown. As used herein, a physical environment or workspace can refer to any unknown or dynamic industrial environment. Unless otherwise specified, physical environment and workspace can be used interchangeably herein, without limitation. A reconstruction or model may define a virtual representation of the physical environment or workspace 100, or one or more objects 106 within the physical environment 100. For purposes of example, the object 106 can be disposed in a bin or container, for instance a bin 107, so as to be positioned for grasping. Unless otherwise specified herein, bin, container, tray, box, or the like can be used interchangeably, without limitation. By way of example, the object 106 can be picked from the bin 107 by one or more robots, and transported or placed in another location, for instance outside the bin 107. The example object 106 is illustrated as a rectangular object, for instance a box, though it will be understood that the objects 106 can be alternatively shaped or define alternative structures as desired, and all such objects are contemplated as being within the scope of this disclosure.

The physical environment 100 can include a computerized autonomous system 102 configured to perform one or more manufacturing operations, such as assembly, transport, or the like. The autonomous system 102 can include one or more robot devices or autonomous machines, for instance an autonomous machine or robot device 104, configured to perform one or more industrial tasks, such as bin picking, grasping, or the like. The system 102 can include one or more computing processors configured to process information and control operations of the system 102, in particular the autonomous machine 104. The autonomous machine 104 can include one or more processors, for instance a processor 108, configured to process information and/or control various operations associated with the autonomous machine 104. An autonomous system for operating an autonomous machine within a physical environment can further include a memory for storing modules. The processors can further be configured to execute the modules so as to process information and generate models based on the information. It will be understood that the illustrated environment 100 and the system 102 are simplified for purposes of example. The environment 100 and the system 102 may vary as desired, and all such systems and environments are contemplated as being within the scope of this disclosure.

Still referring to FIG. 1, the autonomous machine 104 can further include a robotic arm or manipulator 110 and a base 112 configured to support the robotic manipulator 110. The base 112 can include wheels 114 or can otherwise be configured to move within the physical environment 100. The autonomous machine 104 can further include an end effector 116 attached to the robotic manipulator 110. The end effector 116 can include one or more tools configured to grasp and/or move objects 106. Example end effectors 116 include finger grippers or vacuum-based grippers. The robotic manipulator 110 can be configured to move so as to change the position of the end effector 116, for example, so as to place or move objects 106 within the physical environment 100. The system 102 can further include one or more cameras or sensors, for instance a three-dimensional (3D) point cloud camera 118, configured to detect or record objects 106 within the physical environment 100. The camera 118 can be mounted to the robotic manipulator 110 or otherwise configured to generate a 3D point cloud of a given scene, for instance the physical environment 100. Alternatively, or additionally, the Restricted 4 one or more cameras of the system 102 can include one or more standard two-dimensional (2D) cameras that can record or capture images (e.g., RGB images or depth images) from different viewpoints. Those images can be used to construct 3D images. For example, a 2D camera can be mounted to the robotic manipulator 110 so as to capture images from perspectives along a given trajectory defined by the manipulator 110.

Still referring to FIG. 1, the camera 118 can be configured to capture images of the bin 107, and thus the objects 106, along a first or transverse direction 120. In some cases, a deep neural network is trained on a set of objects. Based on its training, the deep neural network can calculate grasp scores for respective regions of a given object, for instance an object within the bin 107. For example, the robot device 104 and/or the system 102 can define one or more neural networks configured to learn various objects so as to identify poses, grasp points (or locations), and/or or affordances of various objects that can be found within various industrial environments. An example system or neural network model can be configured to learn objects and grasp locations, based on images for example, in accordance with various example embodiments. After the neural network is trained, for example, images of objects can be sent to the neural network by the robot device 104 for classification, in particular classification of grasp locations or affordances.

It is recognized herein that, in various state-of-the art approaches or algorithms, the grasp computation score from a grasp neural network is used to determine whether a given bin is empty or contains an object for grasping. In particular, for example, if a given grasp score associated with a particular bin is below a threshold, the bin is determined to be empty. It is recognized herein, however, that such approaches can result in bins determined to be empty that actually have an object within them, among other technical shortcomings. By way of example, one or more objects can be in an arrangement or constellation that is difficult to grasp, such that the grasp neural network computes a grasp score for the associated bin that is below the threshold, thereby incorrectly determining that the bin is empty.

In another example approach to assessing (by a computer system) whether a given bin is empty, a robot can capture color images of the bin, and if the bottom of the bin defines a homogenous color, the bin is determined to be empty when the color image depicts the homogenous color. It is recognized herein, however, that such approaches can result in errors. By way of example, shade or lighting discrepancies can result in bins determined to contain objects, based on the observed color or shade differentiation on the bottom of the bin, that are actually empty. Furthermore, such approaches require that the bottom of a bin defines a homogenous color, which is often not the appearance of existing bins.

In yet another example approach to assessing (by a computer system) whether a given bin is empty, the camera can be placed a predefined distance from the bottom of the bin, and if the system measures a distance from the camera that is less than the predefined distance to the bottom of the bin, the bin is determined to contain an object. That is, an object in a bin can result in a depth measurement from a depth camera that is less than the predefined distance to the bin. Conversely, when there is no object in the bin, the depth image may indicate that the depth measurement from the camera is equal to the predefined distance to the bin. It is recognized herein, however, that assessing whether a bin is empty in this manner is not reliable enough for many industrial applications. By way of example, and without limitation, bins often define slightly curved bottom surfaces, such that defining a predefined or constant distance from the bin bottom to the camera is infeasible, or in some cases, impossible.

Referring again to FIG. 1, the camera 118 can define a depth camera configured to capture depth images of the workspace 100 from a perspective along the transverse direction 120. For example, the bin 107 can define a top end 109 and a bottom end 111 opposite the top end 109 along the transverse direction 120. The bin 107 can further define a first side 113 and a second side 115 opposite the first side 113 along a second or lateral direction 122 that is substantially perpendicular to the transverse direction 120. The bin 107 can further define a front end 117 and a rear end 119 opposite the front end 117 along a third or longitudinal direction 124 that is substantially perpendicular to both the transverse and lateral directions 120 and 122, respectively. Though the illustrated bin 107 defines a rectangular shape, it will be understood that bins or containers can be alternatively shaped or sized, and all such bins or containers are contemplated as being within the scope of this disclosure.

Figure 2:
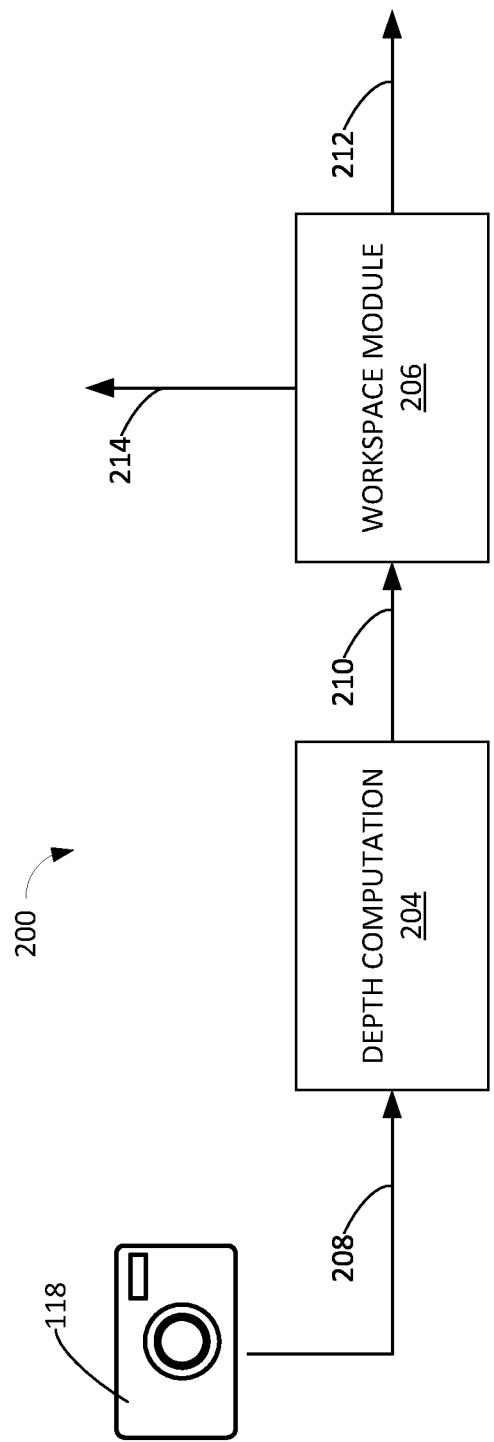
FIG. 2 illustrates an example computing system of the autonomous system configured to determine whether bins are empty, in accordance with an example embodiment.

Referring also to FIG. 2, the autonomous system 102 can define various computing systems, for instance an example computing system 200 that can include a depth camera, for instance the camera 118, which can be configured to generate depth images of a particular scene, for instance the scene defined by the physical environment or workspace 100. Alternatively, or additionally, the example computing system 200 can include multiple cameras 118 configured to generate depth images and color images of a particular scene. The autonomous system 102 can define various computing systems, such as the computing system 200, which can include a depth computation module 204 communicatively coupled to a workspace module 206. The depth computation module 204 can define one or more neural networks configured to predict or infer the location of the bottom end 111 of the bin 107. In particular, the depth computation module 204 can determine the distance from the camera 118 to the bottom end 111 of the bin 107 along the transverse direction 120. In various examples, the depth computation module 204 determines the location of the bottom end 111 at runtime without any a priori knowledge related to the distance of the bottom end 111 from the camera 118. Runtime can refer to the time period in which the camera 118 observes the bin. Thus, the system 200 performs the computations concerning the bin 107 on-the-fly because information concerning the bin 107, for instance information related to the bottom end 111, might not be available at engineering or setup time that precedes the runtime.

The depth computation module 204 can perform unsupervised k-means clustering, so as to determine the location of the bottom end 111 of the bin 107. In particular, for example, the depth computation module 204 can determine a correlation between pixels that are associated with the bottom end 111 of the bin 107. In some cases, the depth computation module 204 identifies pixels in the depth image that have a similar depth (e.g., distance to the camera 118 along the transverse direction 120). Consequently, the depth computation module 204 can define a clustering problem. In particular, given the set of all pixels, the depth computation module 204 can identify clusters of pixels. In an example, a cluster of pixels is at the bottom end 111 of the bin 107, and a cluster of pixels is not at the bottom end 111 of the bin 107. In various examples, the depth computation module 204 can perform k-means clustering to solve the clustering.

After the location of the bottom end 111, in particular the distance from the bottom end 111 to the camera 118 along the transverse direction 120, is determined, information associated with the location from the depth computation module 204 can be obtained by the workspace module 206. In particular, based on the depth image captured by the camera 118, the workspace module 206 can receive a cluster map associated with the bin 107. Based on the depth image of the workspace 100, the depth computation module 204 can generate the cluster map that can define a collection of data points (clusters) that are aggregated together based on certain similarities. The lateral direction 122 and the longitudinal direction 124 can define a horizontal plane, and the transverse direction 120 can define depth, such that the cluster map can indicate clusters in space that is defined by the horizontal plane and depth. In an example, when the bin 107 is empty, the cluster map can define clusters that are close together with respect to the transverse direction 120. Furthermore, these clusters can define patches, or sets, in the horizontal plane. The workspace module 206 can determine the distance of each cluster from the camera 118 along the transverse direction 120. Additionally, the workspace module 206 can compute a respective mean associated with each cluster. The mean can define an average distance that each data point in a particular cluster is from the camera 118 along the transverse direction 120. In an example, the workspace module 206 can determine the location of the bottom end 111 of the bin 107 by identifying the cluster having the mean that defines the largest distance from the camera 118 along the transverse direction 120, as compared to the other means of the other clusters.

Thus, in various examples, the workspace module 206 associates the cluster that corresponds to the mean representing the largest distance to the camera 118 with the bottom end 111 of the bin 107. The workspace module 206 can assign (or classify) pixels to respective clusters. For example, after the clusters are identified or determined, the workspace module 206 can assign each pixel in the image to an identified cluster. In particular, in an example in which the bin 107 is empty, the workspace module 206 can assign the majority of the pixels, for instance more than 95% of the pixels, or between 95% and 98%, to the cluster associated with the bottom end 111 of the bin 107. In some cases, the workspace module 206 can identify other clusters having respective means that indicate that those clusters are closer to the camera 118 along the transverse direction 120 as compared to the cluster associated with the bottom end 111. Such clusters can result from noise within the workspace 100 or the camera 118, or an uneven or imperfect surface defined by the bottom end 111 of the bin 107. The workspace module 206 can assign or associate pixels to the clusters that are separate from the cluster associated with the bottom end 111. Further, the workspace module 206 can compare the number of pixels associated with clusters not at the bottom end 111 to the number of pixels associated with the cluster at the bottom end 111, so as determine a ratio of depth pixels that are not associated with the bottom end 111. The workspace module 206 can compare the ratio to a decision boundary, so as to determine whether the bin 107 is empty or contains an object for grasping. In some examples, the decision boundary is less than about 5%, for instance 2%. For example, when the ratio is less than 2%, such that at least 98% of the pixels are associated with the cluster at the bottom end 111, the workspace module 206 determines that the bin 107 is empty. Continuing with the example, when the ratio is greater than 2%, such that less than 98% of the pixels are associated with the cluster at the bottom end 111, the workspace module 206 determines that the bin 107 contains at least one object. In various examples, the ratio can represent a parameter that is tuned by the workspace module 206. By way of example, the module 206 can be tuned by collecting images of bins that are empty and bins that contain small objects, for instance the smallest objects that the system might encounter (e.g., 1 cm×1 cm×1 cm). By using these images, the decision boundary can be tuned until empty bins are classified as empty and images with at least one object are classified as non-empty. It will be understood that the size of the objects are presented as example, and embodiments can be tuned with objects having various shapes and sizes.

In another example, after the depth computation module 204 performs k-means clustering so as to generate a cluster map, the workspace module 206 can evaluate the clusters in the cluster map along the horizontal plane defined by the lateral direction 122 and the longitudinal direction 124. The workspace module 206 can also evaluate the clusters in the cluster map along the depth dimension defined by the transverse direction 120. Based on the evaluation of the cluster map, the workspace module 206 can determine whether the bin 107 is empty or contains at least one object. In an example, if the workspace module 206 determines that: few clusters are interconnected along the horizontal plane so as to determine that the image defines a large flat surface (e.g., 3 or less spatial clusters are identified); the clusters have distances from the camera 118 along the transverse direction 120 defining respective means that are close together; and the ratio of the pixels assigned to the cluster having the mean that is furthest from the camera 118 along the transverse direction 120 is greater than a predetermined threshold, for instance 98%, then the workspace module 206 determines that the bin 107 is empty. By way of example, determining whether the respective means are close together can depend on the minimum height of an object that can potentially be in the bin. Alternatively, in the example, if one of the three conditions listed above is false, then the workspace module 206 can determine that the bin 107 includes at least one object. In various examples, the workspace module 206 can evaluate the cluster map to determine whether a given bin is empty in less than 10 nanoseconds. Further, in various examples, the workspace module 206 evaluates the cluster map to determine whether a given bin is empty before grasp scores related to the bin are calculated, and thus prior to running a grasp neural network. Thus, in various robotic bin picking applications, it is determined whether an object is inside the bin before any downstream algorithms are performed that determines how to grasp. It is recognized herein that, in some cases, bin picking algorithms can determine a grasp for anything, including empty bins. Thus, if a bin picking algorithm is performed on an empty bin, the system may attempt to lift the empty bin, which is undesired for a plurality of reasons, including, for example, wasted computational resources and time. In some cases, the robot might be damaged by lifting an object (e.g., the empty bin) that it is not designed to grasp. In accordance with various embodiments, by determining whether a bin is empty before performing grasp computations, such undesired results, among others, can be avoided.

Referring again to FIGS. 1 and 2, in an example, the depth computation module 204 obtains a depth image of a workspace, for instance the workspace 100 that includes the bin 107 containing the objects 106, at 208. In various examples, the system 200 can detect the bin 107 within the workspace 100 based on the depth image. In some cases, the bin defines a bottom end 111 and a top end 109 opposite the bottom end 111 along the transverse direction 120, wherein the bottom end 111 is positioned farther from the depth camera 118 along the transverse direction 120 as compared to the top end 109. The top end 109 can define an opening 121 such that the depth camera 118 is further configured to capture the depth image of the bin 107 from a perspective along the transverse direction 120. Based on the depth image, the depth computation module 204 determine a distance from the depth camera 118 to the bottom end 111 along the transverse direction 120. In particular, the depth computation module 204 can perform k-means clustering so as to determine a first cluster and a second cluster, wherein the first cluster is associated with the first distance, and the second cluster is associated with a second distance from the depth camera 118 along the transverse direction 120 that is less than the first distance. Thus, based on the depth image, at 210, the workspace module 204 can generate an output that indicates one or clusters associated with physical data points detected by the depth camera 118. In some cases, the output at 210 may include a cluster map, a heat map, or other indicia that identifies data points.

Furthermore, at 210, the output of the depth computation module 204 is received by the workspace module 206. The workspace module 206 can process the cluster map so as to determine whether the bin 107 is empty or contains at least one object. Thus, based on the depth image and without performing a grasp computation, in various examples, the system 200 can determine whether the bin 107 is empty or contains at least one object, during runtime of the autonomous system 102, in particular the robot 104. For example, the workspace module 206 can, during runtime, assign first pixels to the first cluster, and assign second pixels to the second cluster. The workspace module 206 can compare the second pixels to the first pixels so as to determine a ratio of pixels. Furthermore, the workspace module 206 can compare the ratio of pixels a decision boundary so as to determine whether the bin 107 is empty or contains at least one object.

In an example, when the ratio of pixels is less than the decision boundary, the workspace module 206 determines that the bin is empty. Responsive to determining that the bin 107 is empty, the workspace module 206 can send an indication to an application in control of the robot 104, at 212. The indication can inform the application that the bin 107 is empty so that no grasp computations are performed on the bin 107. In another example, when the ratio of pixels is greater than the decision boundary, the workspace module 206 determines that the bin 107 contains at least one object. Responsive to determining that the bin 107 contains at least one object, the workspace module can activate a neural network to compute a grasp location on the at least object, at 214. For example, the neural network can compute a grasp score on the object. When the grasp score is larger than a predefined threshold, the region associated with the graph score is classified as an area in which the end effector 116, for instance a vacuum-based gripper, can grasp. Conversely, in an example, when the grasp score is lower than the predefined threshold, the region associated with the graph score is classified as an area (e.g., edge, negative space) other than an area in which the end effector 116, for instance a vacuum-based gripper, can grasp. The robot can then grasp the object 106 at the computed grasp location.

Thereafter, in accordance with an example, the system 102, in particular the depth camera 118 or the depth computation 204, can detect a different bin within the workspace 100 of the robot 104. Further, the computing system 200 can determine whether the different bin is empty or contains at last one object before activating a neural network, such that the steps recited are repeated each time the autonomous system 102 detects a new bin.

Figure 3:
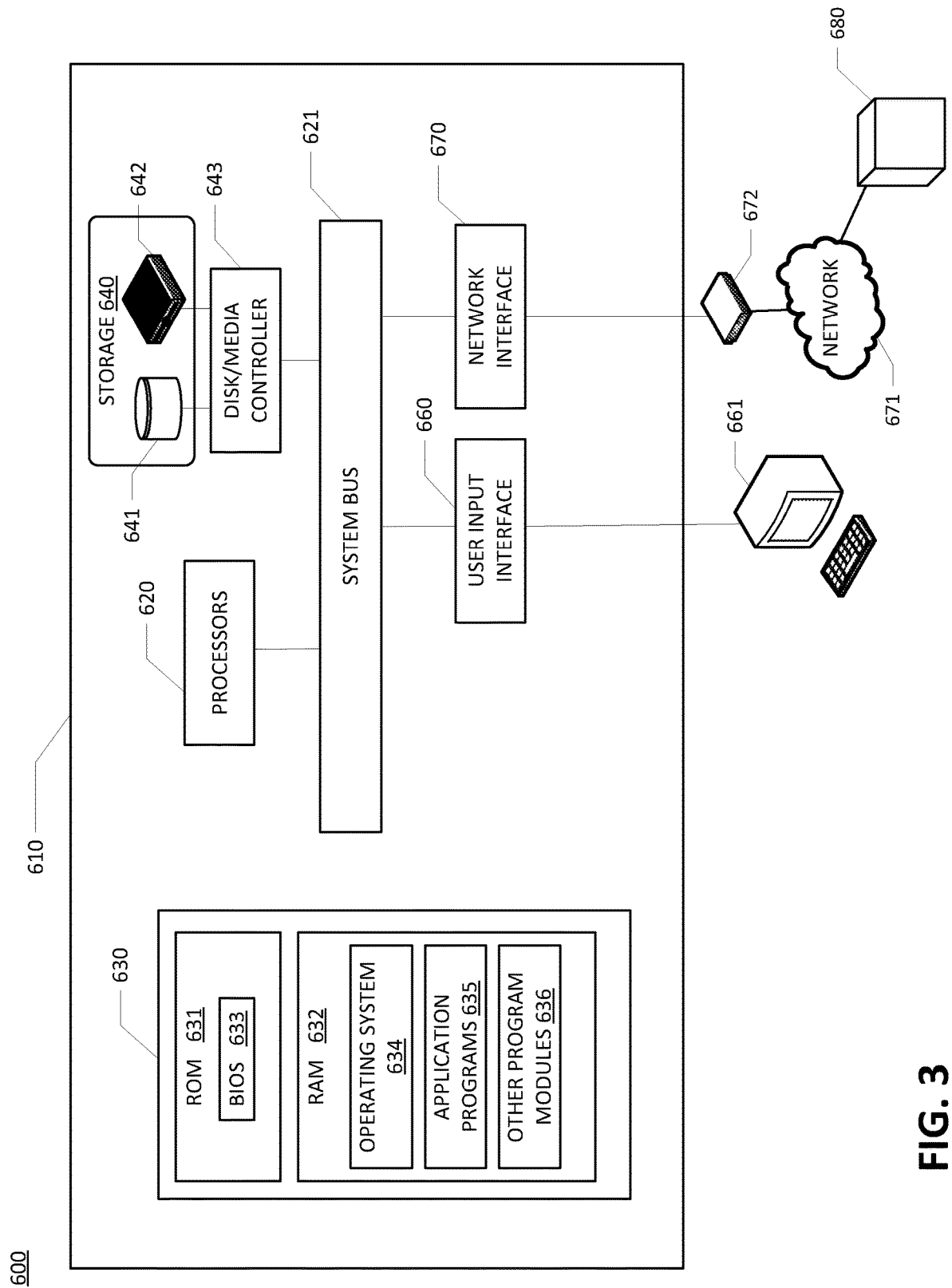
FIG. 3 illustrates a computing environment within which embodiments of the disclosure may be implemented.

FIG. 3 illustrates an example of a computing environment within which embodiments of the present disclosure may be implemented. A computing environment 600 includes a computer system 610 that may include a communication mechanism such as a system bus 621 or other communication mechanism for communicating information within the computer system 610. The computer system 610 further includes one or more processors 620 coupled with the system bus 621 for processing the information. The autonomous system 102, and thus the computing system 200, may include, or be coupled to, the one or more processors 620.

The processors 620 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 620 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 621 may include at least one of a system bus, a memory bus, an address bus, or a message bus, and may permit exchange of information (e.g., data (including computer-executable code), signaling, etc.) between various components of the computer system 610. The system bus 621 may include, without limitation, a memory bus or a memory controller, a peripheral bus, an accelerated graphics port, and so forth. The system bus 621 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 3, the computer system 610 may also include a system memory 630 coupled to the system bus 621 for storing information and instructions to be executed by processors 620. The system memory 630 may include computer readable storage media in the form of volatile and/or nonvolatile memory, such as read only memory (ROM) 631 and/or random access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 may additionally include, for example, operating system 634, application programs 635, and other program modules 636. Application programs 635 may also include a user portal for development of the application program, allowing input parameters to be entered and modified as necessary.

The operating system 634 may be loaded into the memory 630 and may provide an interface between other application software executing on the computer system 610 and hardware resources of the computer system 610. More specifically, the operating system 634 may include a set of computer-executable instructions for managing hardware resources of the computer system 610 and for providing common services to other application programs (e.g., managing memory allocation among various application programs). In certain example embodiments, the operating system 634 may control execution of one or more of the program modules depicted as being stored in the data storage 640. The operating system 634 may include any operating system now known or which may be developed in the future including, but not limited to, any server operating system, any mainframe operating system, or any other proprietary or non-proprietary operating system.

The computer system 610 may also include a disk/media controller 643 coupled to the system bus 621 to control one or more storage devices for storing information and instructions, such as a magnetic hard disk 641 and/or a removable media drive 642 (e.g., floppy disk drive, compact disc drive, tape drive, flash drive, and/or solid state drive). Storage devices 640 may be added to the computer system 610 using an appropriate device interface (e.g., a small computer system interface (SCSI), integrated device electronics (IDE), Universal Serial Bus (USB), or FireWire). Storage devices 641, 642 may be external to the computer system 610.

The computer system 610 may also include a field device interface 665 coupled to the system bus 621 to control a field device 666, such as a device used in a production line. The computer system 610 may include a user input interface or GUI 661, which may comprise one or more input devices, such as a keyboard, touchscreen, tablet and/or a pointing device, for interacting with a computer user and providing information to the processors 620.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium of storage 640, such as the magnetic hard disk 641 or the removable media drive 642. The magnetic hard disk 641 (or solid state drive) and/or removable media drive 642 may contain one or more data stores and data files used by embodiments of the present disclosure. The data store 640 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 600 may further include the computer system 610 operating in a networked environment using logical connections to one or more remote computers, such as remote computing device 680. The network interface 670 may enable communication, for example, with other remote devices 680 or systems and/or the storage devices 641, 642 via the network 671. Remote computing device 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

It should be appreciated that the program modules, applications, computer-executable instructions, code, or the like depicted in FIG. 3 as being stored in the system memory 630 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 610, the remote device 680, and/or hosted on other computing device(s) accessible via one or more of the network(s) 671, may be provided to support functionality provided by the program modules, applications, or computer-executable code depicted in FIG. 3 and/or additional or alternate functionality. Further, functionality may be modularized differently such that processing described as being supported collectively by the collection of program modules depicted in FIG. 3 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 3 may be implemented, at least partially, in hardware and/or firmware across any number of devices.

It should further be appreciated that the computer system 610 may include alternate and/or additional hardware, software, or firmware components beyond those described or depicted without departing from the scope of the disclosure. More particularly, it should be appreciated that software, firmware, or hardware components depicted as forming part of the computer system 610 are merely illustrative and that some components may not be present or additional components may be provided in various embodiments. While various illustrative program modules have been depicted and described as software modules stored in system memory 630, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An autonomous system configured to operate in an active industrial environment so as to define a runtime, the autonomous system comprising:
   a robot defining an end effector configured to grasp a plurality of objects within a workspace, the robot
   a depth camera configured to capture a depth image of the workspace;
   one or more processors; and
   a memory storing instructions that, when executed by the one or more processors, cause the autonomous system to, during the runtime:
      detect a bin within the workspace, the bin capable of containing one or more of the plurality of objects; and
      based on the depth image and without performing a grasp computation, determine whether the bin is empty or contains at least one object,
   wherein the bin defines a bottom end and a top end opposite the bottom end along a transverse direction, the bottom end positioned farther from the depth camera along the transverse direction as compared to the top end, the top end defining an opening such that the depth camera is further configured to capture the depth image of the bin from a perspective along the transverse direction,
   the memory further storing instructions that, when executed by the one or more processors, cause the autonomous system to, during the runtime:
      determine a first distance from the depth camera to the bottom end along the transverse direction,
      perform k-means clustering so as to determine a first cluster and a second cluster, the first cluster associated with the first distance, the second cluster associated with a second distance from the depth camera along the transverse direction that is less than the first distance,
assign first pixels to the first cluster;
assign second pixels to the second cluster;
compare the second pixels to the first pixels so as to determine a ratio of pixels; and
compare the ratio of pixels to a decision boundary so as to determine whether the bin is empty or contains at least one object.

2. The autonomous system as recited in claim 1, the memory further storing instructions that, when executed by the one or more processors, cause the autonomous system to, during the runtime:
when the ratio of pixels is less than the decision boundary, determine that the bin is empty; and
responsive to determining that the bin is empty, sending an indication to an application in control of the robot, the indication informing the application that the bin is empty.

3. The autonomous system as recited in claim 1, the memory further storing instructions that, when executed by the one or more processors, cause the autonomous system to, during the runtime:
when the ratio of pixels is greater than the decision boundary, determine that the bin contains at least one object; and
responsive to determining that the bin contains at least one object, activating a neural network to compute a grasp location on the at least object,
wherein the robot is further configured to grasp the at least one object at the grasp location.

4. A method performed by an autonomous system that includes a robot operating in an active industrial environment so as to define a runtime, the method comprising:
detecting a bin within a workspace of the robot of the autonomous system, the bin capable of containing a plurality of objects;
capturing, by a depth camera, a depth image of the workspace that includes the bin; and
based on the depth image and without performing a grasp computation, determining whether the bin is empty or contains at least one object,
wherein the bin defines a bottom end and a top end opposite the bottom end along a transverse direction, the bottom end positioned farther from the depth camera along the transverse direction as compared to the top end, and the top end defines an opening, the method further comprising capturing the depth image of the workspace through the opening from a perspective along the transverse direction,
wherein determining whether the bin is empty or contains at least one object further comprises:
determining a first distance from the depth camera to the bottom end along the transverse direction,
performing k-means clustering so as to determine a first cluster and a second cluster, the first cluster associated with the first distance, the second cluster associated with a second distance from the depth camera along the transverse direction that is less than the first distance,
assigning first pixels to the first cluster;
assigning second pixels to the second cluster;
comparing the second pixels to the first pixels so as to determine a ratio of pixels; and
comparing the ratio of pixels to a decision boundary so as to determine whether the bin is empty or contains at least one object.

5. The method as recited in claim 4, the method further comprising:
when the ratio of pixels is less than the decision boundary, determining that the bin is empty; and
responsive to determining that the bin is empty, sending an indication to an application in control of the robot, the indication informing the application that the bin is empty.

6. The method as recited in claim 4, the method further comprising:
when the ratio of pixels is greater than the decision boundary, determining that the bin contains at least one object;
responsive to determining that the bin contains at least one object, activating a neural network to compute a grasp location on the at least object; and
the robot grasping the at least one object at the grasp location.

7. The method as recited in claim 4, the method further comprising:
detecting a different bin within the workspace of the robot; and
determining whether the different bin is empty or contains at last one object before activating a neural network, such that the steps recited in claim 4 are repeated each time the autonomous system detects a new bin.

* * * * *